April 17, 1928.

H. M. LAMBERT 1,666,883

METHOD OF MAKING PNEUMATIC TIRES

Filed May 25, 1927

INVENTOR
Henry M. Lambert
BY
ATTORNEY

Patented Apr. 17, 1928.

UNITED STATES PATENT OFFICE.

HENRY M. LAMBERT, OF PORTLAND, OREGON; HELEN H. LAMBERT EXECUTRIX OF SAID HENRY M. LAMBERT, DECEASED.

METHOD OF MAKING PNEUMATIC TIRES.

Application filed May 25, 1927. Serial No. 194,000.

My invention has for its object to provide a new and improved method of manufacturing pneumatic tires, particularly those having thick ventilated treads. Heretofore, it has been the practice to build up the tire carcass of rubber and textile material, place a thick slab of tread stock around the periphery of the carcass, then place the same in a mold with core pins around the slab of rubber and form the tread holes by the use of an air bag to inflate the carcass and squeeze the tread rubber radially to cause it to flow between and around the core pins. Such method is somewhat costly and it does not always result in perfect tires, the tires occasionally separating adjacent to the holes. My invention therefore has for its prime object the provision of a method which will not only reduce the cost of manufacture but will result in the production of more uniformly perfect tires.

Generically the present invention consists in first building a tire carcass according to any of the methods now in vogue and then placing a sufficient quantity of tread rubber on the periphery of the tire as may be required in the finished tire. The carcass with the applied tread stock is placed in a vulcanizing mold, an air bag being first inserted. The mold is then closed and the air bag inflated to a pressure slightly in excess of the atmosphere and sufficient to hold the tread stock within the tread forming cavity portion of the molding chamber so as to substantially fill the same. Then hole or recess forming pins are forced into the tread stock, but before forcing the pins into the tread stock I preferably apply sufficient heat to the mold to begin the softening of the rubber, thus rendering the rubber pliable and permitting an easier penetration of the pins and the consequent displacement of the rubber to form the apertures. As the pins are forced into place and displace the tread stock, the tread portion of the carcass is, of course, moved inwardly or somewhat flattened. As soon, however, as the pins are placed the air bag is brought up to full inflation pressure with the result that the carcass is squeezed outwardly at the tread and the tread stock is forced into tight engagement with the walls of the molding cavity, the mass being compacted and air bubbles pressed out, thus ensuring a perfect union between the parts of the tire. This pressure in the air bag tends to cause the bag to assume a true circle in cross section and hence exerts its principal force radially from the center of the molding cavity against the tread stock, which ensures the formation of a full tread without air pockets, etc.

As soon as vulcanization has been completed the pins are withdrawn, the mold opened and the tire and air bag removed in the usual manner.

In the accompanying drawings I have illustrated diagrammatically the steps employed to constitute my process, and by reference to the drawing it will be observed that Figure 1 is a cross section of a tire carcass built up with the tread stock in place prior to introduction into the vulcanizing mold.

Figure 1:
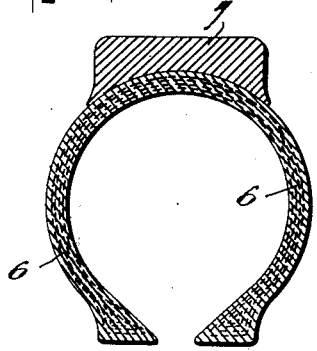
Figure 2:
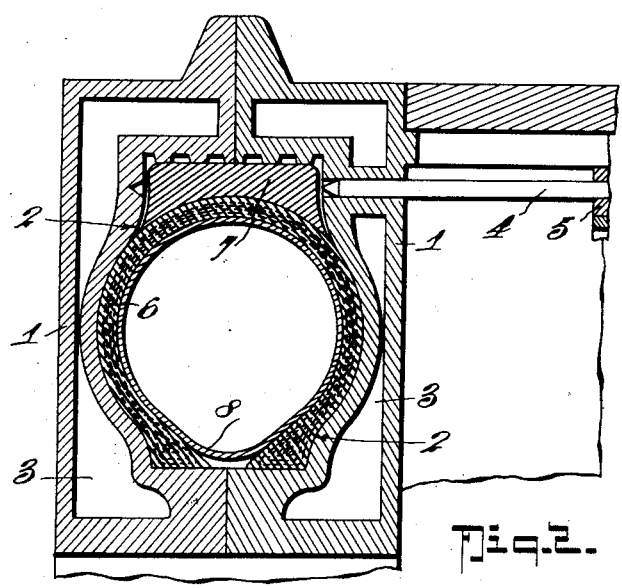
Figure 2 is a detail cross section of a vulcanizing mold with the tire carcass of Figure 1 in place and the air bag partly inflated.

In the drawings, in which like numerals indicate like parts in all of the figures, 1 is the mold which may be of the usual type and is provided with the molding chamber 2 and the steam jacket chamber 3.

4 designates the core pins which may be carried by a ring 5 and inserted through apertures in the side walls of the mold, the mold, of course, being of the two-part or split type.

6 indicates the carcass of rubber and rubberized textile material (fabric, cord, or a combination of fabric and cord) and 7 represents the tread rubber stock.

Figure 5:
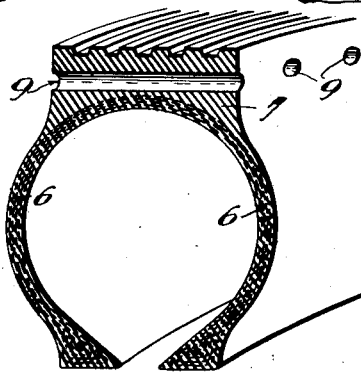
Figure 5 is a sectional perspective view of a portion of the finished tire.

The air bag is indicated by the reference character 8 and the transverse holes in the finished tire (Figure 5) are indicated by 9.

Figure 3:
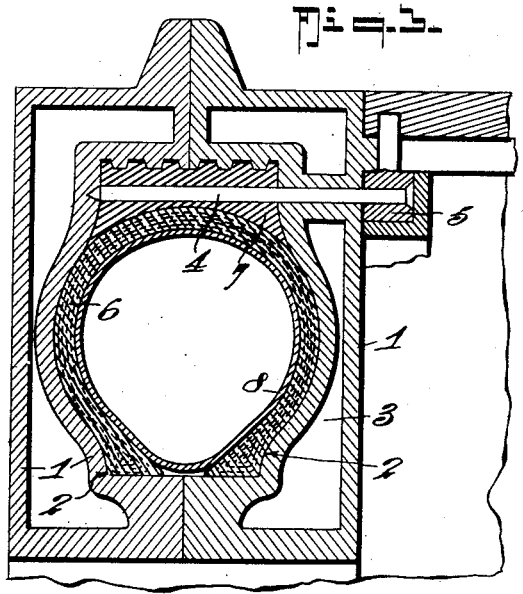
Figure 3 is a view similar to Figure 2 after the core pins have been pressed into place.
Figure 4:
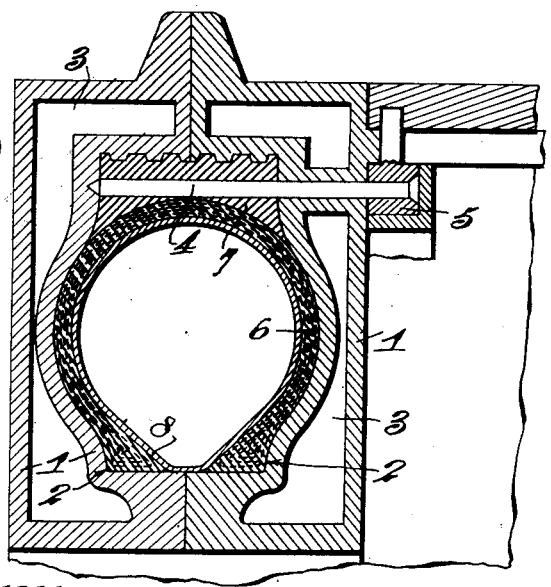
Figure 4 is a view similar to Figure 3 after the air bag has been fully inflated.

As before intimated in applying my method the carcass 6 is built up on a form in any of the usual ways and sufficient tread rubber is placed around the periphery of the carcass to form the required tread of the tire. This structure is then placed in the mold 1 (after, of course, inserting the air bag 8) and the mold is closed, it being, of course, understood that at this time the pins 4 are in the withdrawn position. Air is then placed in the air bag at a sufficient pressure to hold the carcass in contact with the mold walls and project the tread stock to approximately fill the tread portion of the mold chamber 2. Then steam may be admitted into the chamber 3 to warm the rubber to a sufficient degree to render it plastic and the pins 4 are forced home. As the pins 4 are forced into the rubber a corresponding volume of rubber will be displaced, with the result that the carcass will be flattened somewhat at its crown or periphery, as indicated in Figure 3. The full air pressure is then introduced into the air bag and as the carcass cannot move laterally and as the pressures of air actually tend to produce a circular cross section of the carcass the greatest pressure will be active against the tread of the tire and will ensure the tread rubber flowing into all of the interstices of the walls of the rubber molding cavity, displacing any air that may be present and thus prevent the formation of air bubbles in the stock which may cause breaking down of the stock tread. From the foregoing, taken in connection with the accompanying drawing, it is thought that the method will be clear to those skilled in the art.

I am aware that air bags have heretofore been used in the molding of pneumatic tires and that core pins have been employed in the making of cushion tires and that in the making of cushion tires core pins have been forced through the molds into the rubber stock. I am also aware that in the making of ventilated pneumatic tires core pins have been employed but in the latter case the core pins have been placed before inflation of the air bag takes place and the rubber tread stock is forced, by air bag inflation, radially between the adjacent pins and into the peripheral portion of the molding cavity. I therefore do not claim broadly the use of core pins or the forcing of core pins into rubber to produce holes but

What I claim is:

1. The method of manufacturing pneumatic tires having ventilated treads which includes the steps of building up the carcass proper, applying a thick body of tread stock over the carcass periphery, placing an air bag within the carcass, placing the mass in a confining mold, closing the mold and inflating the air bag to a pressure above the atmosphere to tend to cause the plastic mass to fill the molding cavity of the mold, forcing core pins into the tread stock, and vulcanizing the mass while maintaining pressure within the air bag.

2. The method of building pneumatic tires having ventilated thick treads, which consists of the following steps, to-wit: building the carcass in any usual way; applying a thick layer of tread rubber over the periphery of the carcass; applying inflation pressure within the carcass while restraining the outside of the carcass and tread walls within predetermined form limits; applying heat to the mass to render the rubber more or less fluid; forcing core pins into the tread rubber while the mass is under the aforesaid inflated pressure and restrained, thereby displacing tread rubber and applying a force counter to the inflation pressure against the tread of the carcass; continuing the application of heat until vulcanization occurs, meanwhile maintaining sufficient inflation pressure to compact the mass and finally releasing the restraining mass.

3. The method of manufacturing pneumatic tires of the ventilated tread kind, which method comprises the following steps, to-wit; building up the carcass proper in any desired way; applying a thick body of tread rubber over the periphery of the carcass; inserting an air bag within the carcass and placing the mass in a vulcanizing mold; partially inflating the air bag; inserting core pins through the mold walls into the tread rubber thereby displacing tread rubber and cooperating with the action of the air bag to cause the rubber to flow into the spaces in the molding cavity walls; continuing the inflation of the air bag and heating the mold to effect vulcanization under pressure; withdrawing the core pins; and finally removing the vulcanized tire from the mold.

HENRY M. LAMBERT.